(12) United States Patent
Adamson et al.

(10) Patent No.: US 12,404,177 B2
(45) Date of Patent: Sep. 2, 2025

(54) EXFOLIATION OF GRAPHITE TO GRAPHENE BY INTERFACE STABILIZATION

(71) Applicant: University of Connecticut, Farmington, CT (US)

(72) Inventors: Douglas H. Adamson, Mansfield Center, CT (US); Richard Parnas, Ashford, CT (US); Prabodha Abeykoon, Willimantic, CT (US)

(73) Assignee: University of Connecticut, Farmington, CT (US)

( * ) Notice: Subject to any disclaimer, the term of this patent is extended or adjusted under 35 U.S.C. 154(b) by 771 days.

(21) Appl. No.: 17/674,389

(22) Filed: Feb. 17, 2022

(65) Prior Publication Data

US 2023/0257271 A1     Aug. 17, 2023

Related U.S. Application Data

(60) Provisional application No. 63/150,767, filed on Feb. 18, 2021.

(51) Int. Cl.
*C01B 32/19*     (2017.01)
*C03C 25/44*     (2006.01)

(52) U.S. Cl.
CPC ............. *C01B 32/19* (2017.08); *C03C 25/44* (2013.01); *C03C 2218/328* (2013.01)

(58) Field of Classification Search
CPC .................... C03C 25/44; C03C 2218/328
See application file for complete search history.

(56) References Cited

U.S. PATENT DOCUMENTS 5,718,747 A     2/1998   Okusawa
6,160,042 A     12/2000  Ishida
(Continued)

FOREIGN PATENT DOCUMENTS

WO     WO 2018/143957 A1     8/2018

OTHER PUBLICATIONS

Woltornist, Conductive Thin Films of Pristine Graphene by Solvent Interface Trapping, ACS Nano, vol. 7, Issue 8, pp. 7062-7066, 2013 (Year: 2013).*

(Continued)

*Primary Examiner* — Anthony J Zimmer
*Assistant Examiner* — Jaanzeb C Raja
(74) *Attorney, Agent, or Firm* — McCarter & English, LLP (57) ABSTRACT

Systems and methods are provided that may utilize a glass substrate to selectively withdraw exfoliated graphene from a high-energy interface between immiscible solvents. The exfoliated graphene preferentially adheres to the surface of the glass substrate for withdrawal from the noted high energy interface, leaving behind the graphite (which is too large to be effectively adsorbed relative to the glass substrate). The disclosed systems and methods are easily implemented and offer significant advantages for graphene production relative to conventional systems and methods, e.g., the disclosed systems/methods do not require the input of heat or mechanical energy which translates to processes that are both cheaper to run and do not result in damage to the graphene. Still further, the disclosed systems/methods do not require chemical modification of the graphene, again lowering the cost considerably and not damaging the graphene structure.

5 Claims, 11 Drawing Sheets

(56) References Cited

U.S. PATENT DOCUMENTS

| | | | |
|---|---|---|---|
| 6,414,041 | B1 | 7/2002 | Gluck |
| 7,566,410 | B2 | 7/2009 | Song et al. |
| 8,277,936 | B2 | 10/2012 | Boussaad |
| 8,303,922 | B2 | 11/2012 | Lin et al. |
| 8,968,873 | B2 | 3/2015 | Adamson et al. |
| 9,646,735 | B2 | 5/2017 | Adamson et al. |
| 9,685,261 | B2 | 6/2017 | Adamson et al. |
| 10,049,817 | B2 | 8/2018 | Adamson et al. |
| 10,266,413 | B2 | 4/2019 | Adamson et al. |
| 10,832,828 | B2 | 11/2020 | Adamson et al. |
| 11,004,606 | B2 | 5/2021 | Adamson et al. |
| 11,355,259 | B2 | 6/2022 | Adamson et al. |
| 2010/0099782 | A1 | 4/2010 | Lee et al. |
| 2010/0152386 | A1 | 6/2010 | Miwa et al. |
| 2011/0064938 | A1 | 3/2011 | Breindel et al. |
| 2011/0143051 | A1 | 6/2011 | Ohashi et al. |
| 2012/0052395 | A1 | 3/2012 | Badre et al. |
| 2013/0210639 | A1 | 8/2013 | Link et al. |
| 2018/0327618 | A1 | 11/2018 | McManus |
| 2020/0407571 | A1 | 12/2020 | Adamson et al. |

OTHER PUBLICATIONS

Abeykoon, Langmuir, Chromatographic Approach to Isolate Exfoliated Graphene, vol. 37, Issue 31, pp. 9281-9636, 2021 (Year: 2021).*

Toldra, F., Jansen, N.B. & Tsao, G.T. Use of porous glass fiber as a support for biocatalyst immobilization. Biotechnol Lett 8, 785-790 (1986). https://doi.org/10.1007/BF01020823 (Year: 1986).*

PCT International Search Report and Written Opinion dated May 27, 2014 for PCT/US2014/017420.

PCT International Search Report and Written Opinion dated Aug. 14, 2015 for PCT/US2015/033011.

PCT International Search Report and Written Opinion dated Jan. 16, 2019 for PCT/US2015/058532.

Hernandez, et al., High-Yield Production of Graphene by Liquid-Phase Exfoliation of Graphite. *Nat. Nanotechnol.* 2008, 3 (9), 563-568.

Li, et al., Large-Area Synthesis of High-Quality and Uniform Graphene Films on Copper Foils. *Science.* 2009, 324 (5932), 1312-1314.

Lotya, et al., Liquid Phase Production of Graphene by Exfoliation of Graphite in Surfactant/Water Solutions. *J. Am. Chem. Soc.* 2009, 131 (10), 3611-3620.

Coleman, Liquid-Phase Exfoliation of Nanotubes and Graphene. *Adv. Funct. Mater.* 2009, 19 (23), 3680-3695.

Coleman, et al. Two-Dimensional Nanosheets Produced by Liquid Exfoliation of Layered Materials. *Science* (80-. ). 2011, 331 (6017), 568-571.

Woltornist et al., Conductive Thin Films of Pristine Graphene by Solvent Interface Trapping, ACSCANO, vol. 7, No. 8, pp. 7062-7066, 2013.

Paton, et al., Scalable Production of Large Quantities of Defect-Free Few-Layer Graphene by Shear Exfoliation in Liquids. *Nat. Mater.* 2014, 13 (6), 624-630.

Seiler, et al., Effect of Friction on Oxidative Graphite Intercalation and High-Quality Graphene Formation. *Nat. Commun.* 2018, 9 (1), 1-9.

U.S. Appl. No. 63/150,767, filed Feb. 18, 2021.

* cited by examiner

EXFOLIATION OF GRAPHITE TO GRAPHENE BY INTERFACE STABILIZATION

CROSS-REFERENCE TO RELATED APPLICATION

The present application claims priority benefit to a provisional patent application entitled "Exfoliation of Graphite to Graphene by Interface Stabilization," which was filed on Feb. 18, 2021, and assigned Ser. No. 63/150,767. The entire content of the foregoing provisional patent application is incorporated herein by reference.

GOVERNMENT RIGHTS

This invention was made with government support under DMR 1535412 awarded by the National Science Foundation, Division of Materials Research. The government has certain rights in the invention.

BACKGROUND

Technical Field

The present disclosure relates to systems and methods for efficient and cost effective graphene production of high quality, wherein the exfoliated graphene is withdrawn/recovered from the high-energy interface between two immiscible solvents, e.g., using a glass substrate such as glass beads and/or glass fibers. In implementations of the disclosed systems and methods, the substrate used to withdraw the exfoliated graphene may contribute to establishing the high-energy interface.

Background Art

Graphene is a one-atom-thick sheet of carbon with extraordinary properties, such as high carrier mobility, excellent thermal conductivity, low opacity with negligible reflectance, and high mechanical strength. In recent years, these properties have been utilized for electronic devices, such as sensors, transparent conductive electrodes, supercapacitors, solar cells, and nanocomposites with chemical selectivity, and electrical and thermal conductivity. Yet, a challenge for the widespread application of graphene is the high cost of its synthesis.

Among the different methods of graphene synthesis, micromechanical exfoliation (known as the "scotch tape" method), chemical vapor deposition (CVD), and epitaxial growth result in comparatively defect-free graphene. However, these methods produce one graphene sheet at a time and are thus limited to small-scale production. Significantly larger amounts of graphene can be produced by the physical and chemical exfoliation of bulk graphite. These approaches include liquid exfoliation methods, such as organic solvent and surfactant-assisted sonication, shear exfoliation, thermal exfoliation of intercalated graphite, and electrochemical exfoliation. While these methods are scalable, drawbacks include the use of high-boiling-point solvents, surfactants, and the need for high-energy input.

Another widely used approach to produce graphene is the oxidation of graphite to graphene oxide (GO). GO can be exfoliated and suspended in water and is often reduced in the final step. While the reduction restores some of the original graphene properties, the process damages the graphene sheet and adds significant cost.

In our previous work, we have found that graphite exfoliates into graphene spontaneously at the high-energy interface between water and heptane. Simple hand shaking of graphite with water and heptane forms a water-in-oil emulsion stabilized by graphene sheets. The surface tension of graphene is $\gamma g=54.8$ mN/m, which lies between the surface tension of water and heptane (72.9 and 20.1 mN/m, respectively), giving a positive spreading parameter of $S=6.6$ mN/m. This thermodynamically driven process results in graphite spontaneously spreading and exfoliating into graphene across the interface formed between water and heptane, lowering the interfacial energy. Still, only a fraction of graphite exfoliates into graphene from this solvent interface trapping method (SITM), as once the interface is covered with graphene, the driving force for exfoliation disappears. Additionally, natural graphite is not a perfect single crystal, which can result in not all of the material being able to exfoliate. Even though this method has been used to prepare polymer nanocomposites with a variety of properties, separating graphene and few-layer graphene (FLG) from the unexfoliated graphite is challenging.

The SITM approach is most commonly used for stabilizing emulsions, but has also been shown to result in graphene spontaneously climbing the surface of glass, either the walls of a glass vial or a glass slide placed in the vial. [See, Woltornist, S. J.; Oyer, A. J.; Carrillo, J. M. Y.; Dobrynin, A. V.; Adamson, D. H.; "Conductive Thin Films of Pristine Graphene by Solvent Interface Trapping," ACS Nano 2013, 7, 7062-7066; Ward, S. P.; Abeykoon, P. G.; McDermott, S. T.; Adamson, D. H.; "Effect of Aqueous Anions on Graphene Exfoliation," Langmuir 2020, 36, 10421-10428] The explanation for this behavior is that graphene spreads to minimize the contact area between the water-wet glass surface and the surrounding heptane vapor in the vial. This climbed film is electrically conductive and has been shown by transmission electron microscopy (TEM) to be composed of overlapping graphene sheets.

Despite efforts to date, conventional approaches to graphene production have significant shortcomings including, inter alia, resulting in a very high cost for graphene and, as a general matter, graphene production and its application are limited by its expense relative to other coatings/materials.

The systems and methods of the present disclosure advantageously lower the cost of graphene production and improve the quality of the graphene produced thereby.

SUMMARY

According to the present disclosure, systems and methods for the efficient and cost effective production of high quality graphene are provided. The disclosed systems/methods produce graphene by withdrawing/recovering exfoliated graphene from the high-energy interface between immiscible solvents (e.g., two immiscible solvents). In exemplary embodiments of the present disclosure, a glass substrate may be used to withdraw the exfoliated graphene from the high energy interface, e.g., a wetted class substrate such as wetted glass beads and/or wetted glass fiber.

According to exemplary embodiments of the present disclosure, a climbing phenomena with a chromatographic technique may be used to separate exfoliated graphene sheets from unexfoliated graphite by using glass beads as the stationary phase. Glass beads may be employed to maximize the surface area available for graphene to adhere. Two exemplary methods utilizing glass beads are disclosed herein. The first exemplary method is similar in concept to conventional chromatography with a mobile phase washing through a packed column of glass beads. The second exemplary method uses successive washes of the same packing material, but with the glass beads agitated during washing to more efficiently remove unexfoliated graphite particles.

Thus, in a first implementation of the disclosed systems/methods, exfoliated graphene is withdrawn/recovered from the high energy interface using glass beads. The glass beads may be wetted prior to introduction to the high energy interface.

In a second implementation of the disclosed systems/methods that does not utilize glass beads, exfoliated graphene is withdrawn/recovered from the high energy interface using glass fibers. The glass fibers may be wetted prior to introduction to the high energy interface. In further implementations of the disclosed systems/methods, metals (e.g., gallium) or plastics (e.g., high density polyethylene (HDPE)) may be employed in establishing the high energy interface and/or withdrawing exfoliating graphene from the high energy interface.

Various immiscible solvents and solvent systems may be used in the exfoliation process. Exemplary systems for establishing a high energy interface according to the present disclosure are summarized in the following table:

TABLE

Combinations of Surfaces and/or Solvents
for Establishing High Energy Interface
for Exfoliated Graphene Recovery

| Surface/Solvent 1 | Surface /Solvent 2 |
| --- | --- |
| Water | Heptane, Pentane like alkanes/hydrocarbons |
| Glass (hydrophilic) | Heptane, Pentane like alkanes/hydrocarbons |
| Chlorosilane treated glass (hydrophobic) | Water |
| Water | Styrene, methyl methacrylate like monomers |
| Water | Chloroform |
| Gallium | Heptane |
| Glycerol | Heptane |
| Heptane | Acetonitrile |
| PTFE | Water |
| Gallium | Water |
| HDPE | Water |
| Polypropylene | Water |

In implementations where a glass substrate is used to establish and/or withdraw exfoliated graphene from a high energy interface, the glass substrate used to withdraw and recover the graphene from the immiscible solvent interface may take various forms, e.g., glass beads or glass fibers as described herein, and the system/method for graphene production may be batch, semi-batch or continuous in operation.

The disclosed systems/methods offer significant advantages over conventional techniques for production of graphene by, inter alia, reducing energy requirements and limiting the exposure of the graphene to potentially damaging forces. Additional features, functions and benefits of the disclosed systems and methods will be apparent from the description which follows, particularly when read in conjunction with the appended figures.

BRIEF DESCRIPTION OF THE FIGURES

To assist those of skill in the art in making and using the disclosed systems and methods, reference is made to the accompanying figures, wherein.

DESCRIPTION OF EXEMPLARY EMBODIMENTS

The systems and methods of the present disclosure advantageously utilize the high-energy interface between two immiscible solvents to force stacked graphene sheets to exfoliate and spread. The surface activity of graphene produced by this activity may be harnessed to form emulsions that serve as precursors for the synthesis of foam-like materials reinforced with graphene with optimized mechanical and electrical properties. These reinforced polymeric materials have the potential to be used as strong and lightweight structural materials, electrodes in capacitors and batteries, substrates for flexible electronics, electrically conductive, high surface area catalyst supports, and super-absorbent materials.

Mixing of chemically and physically different species such as polymer chains, colloidal particles, and solvents is one of the major factors hindering future advances in the development of functional materials. A prominent example of this are graphene based polymeric materials, where graphene's lack of compatibility/solubility is commonly overcome by approaches that compromise its superior electrical, thermal, and mechanical properties and make the composite materials less attractive for future development.

The systems and methods of the present disclosure overcome the noted obstacles by utilizing the high-energy interface between two immiscible solvents to force stacked graphene sheets to exfoliate and spread. Lowering the overall free energy of the system drives this rearrangement of sheets. Thus, the disclosed systems/methods do not require the input of heat or mechanical energy. This means that the process is both cheaper to run and does not result in damaging the graphene. The disclosed approach also does not require chemical modification of the graphene, again lowering the cost considerably and not damaging the graphene structure.

According to the systems and methods of the present disclosure, graphene is produced by the exfoliation of graphite. The process is driven by the spontaneous spreading of graphene at high energy interfaces, such as glass that is wetted, e.g., by water, in contact with an oil, such as heptane. Additional systems for establishing the requisite high energy interface are described in the Table above. The present disclosure is not limited by or to the exemplary systems for establishing the high energy interface as specifically described herein. The graphene sheets that comprise graphite spread and exfoliate at the high energy interface, e.g., the water/oil interface, to lower the interfacial energy of the system. In exemplary embodiments utilizing a glass substrate, the graphene coating the glass surface can then be recovered after washing away un-exfoliated graphite.

In exemplary embodiments of the present disclosure, graphene recovery may be effectuated by placing the glass in water, another hydrophilic solvent or a combination/mixture thereof. The glass itself can take various forms. Thus, for example, the glass may be in the form of bead(s) or continuous fiber(s) that pass through the water/oil interface that is stabilized by graphene. In implementations that utilize glass fiber(s), the individual fiber(s) pick up the graphene and, in a continuous process, may pass through a hydrophilic solvent where the graphene is removed.

The disclosed approach to exfoliating graphite has significant commercial potential as it does not require chemical functionalization of the graphite and does not require high temperatures. It also does not require aggressive mechanical processes that are known to damage the graphene sheets.

Figure 1:
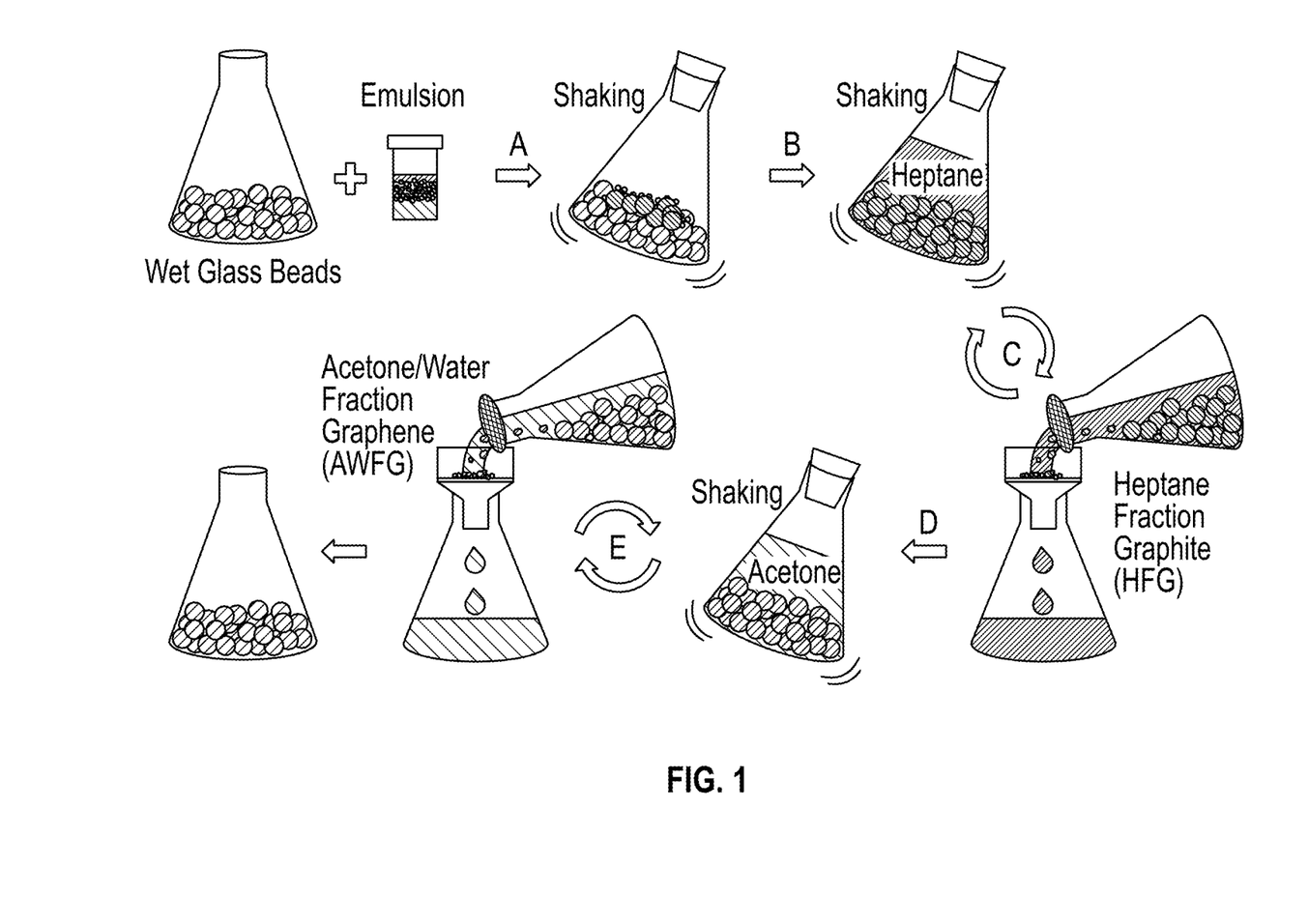
FIG. 1 is a schematic representation of an exemplary multi-step glass bead-based procedure for graphene production according to the present disclosure.

According to a first exemplary approach of the present disclosure, glass beads may be utilized. Thus, as schematically depicted in FIG. 1, an exemplary exfoliation method according to the present disclosure is depicted. The disclosed method entails a series of steps, that generally include the following:

Step A: An emulsion is formed by pouring a graphene emulsion onto wetted glass beads, e.g., in a flask;
Step B: Shaking the flask until all the glass beads are covered with graphene and then adding heptane;
Step C: Continuous shaking, washing and filtering of the glass beads with heptane until no more graphite comes out;
Step D: Adding acetone to the beads; and
Step E: Continuous shaking, washing and filtering the glass beads with acetone until all the acetone/water fraction graphene (AWFG) comes out.

In an exemplary implementation of the method depicted in FIG. 1, n-heptane (6 ml) and natural graphite (100 mg) were added to a glass vial (40 ml). This vial was then bath sonicated (Branson 80 W B2510DTH) for 20 minutes to break up any large particle(s) present in the graphite. Then, deionized (DI) water (14 ml) was added, the system was hand shaken for 5 minutes to exfoliate the graphite and form an emulsion. Cleaned and dried glass beads were added into a conical flask. Then, 100 ml water was added to wet the glass beads. The mouth of the flask was covered with a wire mesh (1 mm×1 mm Clear Opening) to hold the glass beads in and excess water was removed. Then, the prepared emulsion was poured onto the glass beads inside the flask. Next, heptane was used to wash the unexfoliated graphite. This was done by adding about 300 ml of heptane each time, vigorously shaking the flask for about 3-5 seconds and pouring heptane and suspended graphite onto filter paper (Whatman, grade 50, 2.7 μm pore size) to collect "heptane fraction graphite". This process was continued until no more graphite exits from the column. The remaining graphene attached to the glass beads was removed by using either water or acetone.

In a second example of the foregoing bead-based approach, n-heptane and natural graphite were added to a glass vial. The vial was then bath sonicated to break up large particle(s) present in the graphite. Then, DI water was added, the system was hand shaken to exfoliate the graphite and form an emulsion. Cleaned and dried glass beads were added into a conical flask. Then, water was added to wet the glass beads. The mouth of the flask was covered with a wire mesh to hold the glass beads in and excess water was removed. Then, the prepared emulsion was poured onto the glass beads inside the flask. In contrast to the exemplary procedure outlined above, water or acetone (about 300 ml) are added to the flask, the flask was vigorously shaken for about 3-5 seconds and the acetone or water was poured onto a PTFE membrane (0.45 μm pore size) to collect an "acetone/water fraction graphene". This process may be continued until all the graphene comes out and glass beads look clean.

All the filter papers and PTFE membranes with each graphite fractions were placed in a convection oven (Blue M, Stabil-Therm) at 60° C. overnight to dry.

Figure 2:
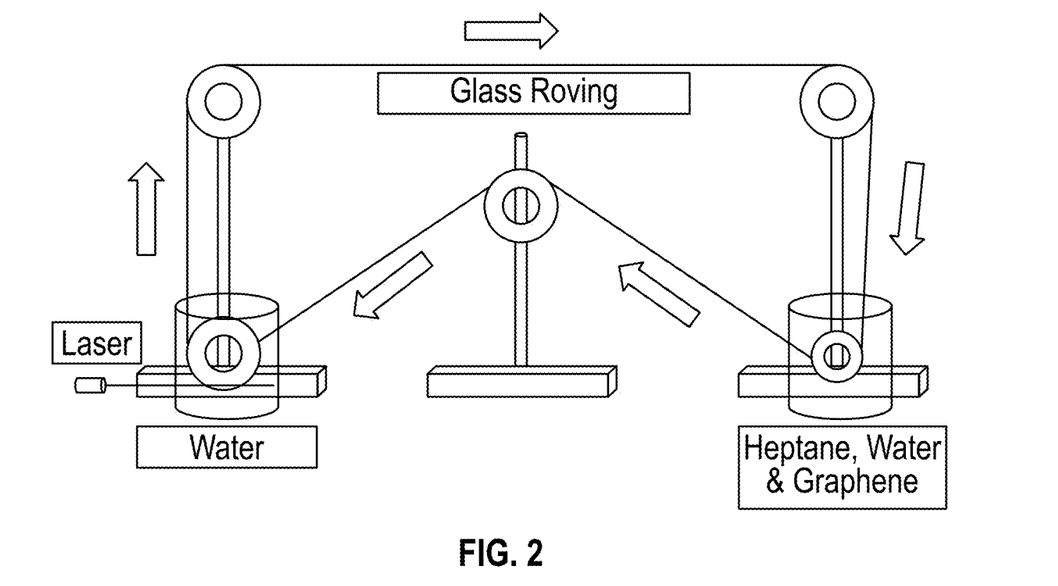
FIG. 2 is a schematic diagram of a fiber exfoliation set up according to an alternative exemplary graphene production method according to the present disclosure.
Figure 3:
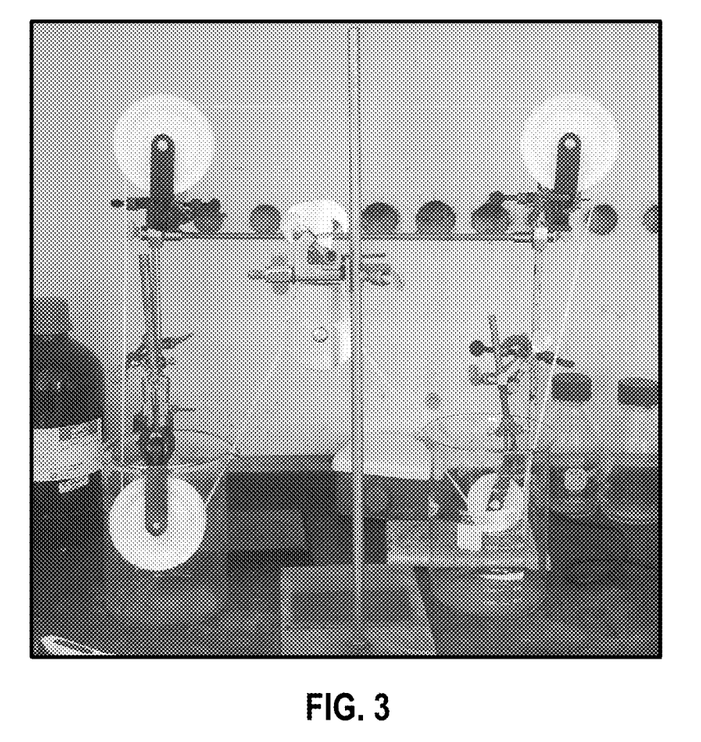
FIG. 3 is an image of an exemplary bench-top fiber exfoliation apparatus corresponding in material respects to the schematic diagram of FIG. 2.

In a second exemplary approach according to the present disclosure and as schematically depicted in FIGS. 2 and 3, a glass fiber loop may be used. Thus, in an exemplary implementation, the fiber is first passed through a mixture of heptane, water and graphite. This mixture contains exfoliated graphite (graphene) at the oil/water interface, and some of this graphene is adsorbed onto the glass fiber as it moves through the mixture. The fiber is then passed through a beaker containing water. Here the graphene desorbs from the glass fiber and is deposited into the water. The glass fiber then passes through the original mixture containing graphene, and again through the water. This continuous process delivers graphene to the water from which it can be recovered. The graphite is too large to be adsorbed strongly enough onto the glass fiber to be removed from the graphite/water/heptane flask and is thus separated from the graphene by the noted process.

Figure 4:
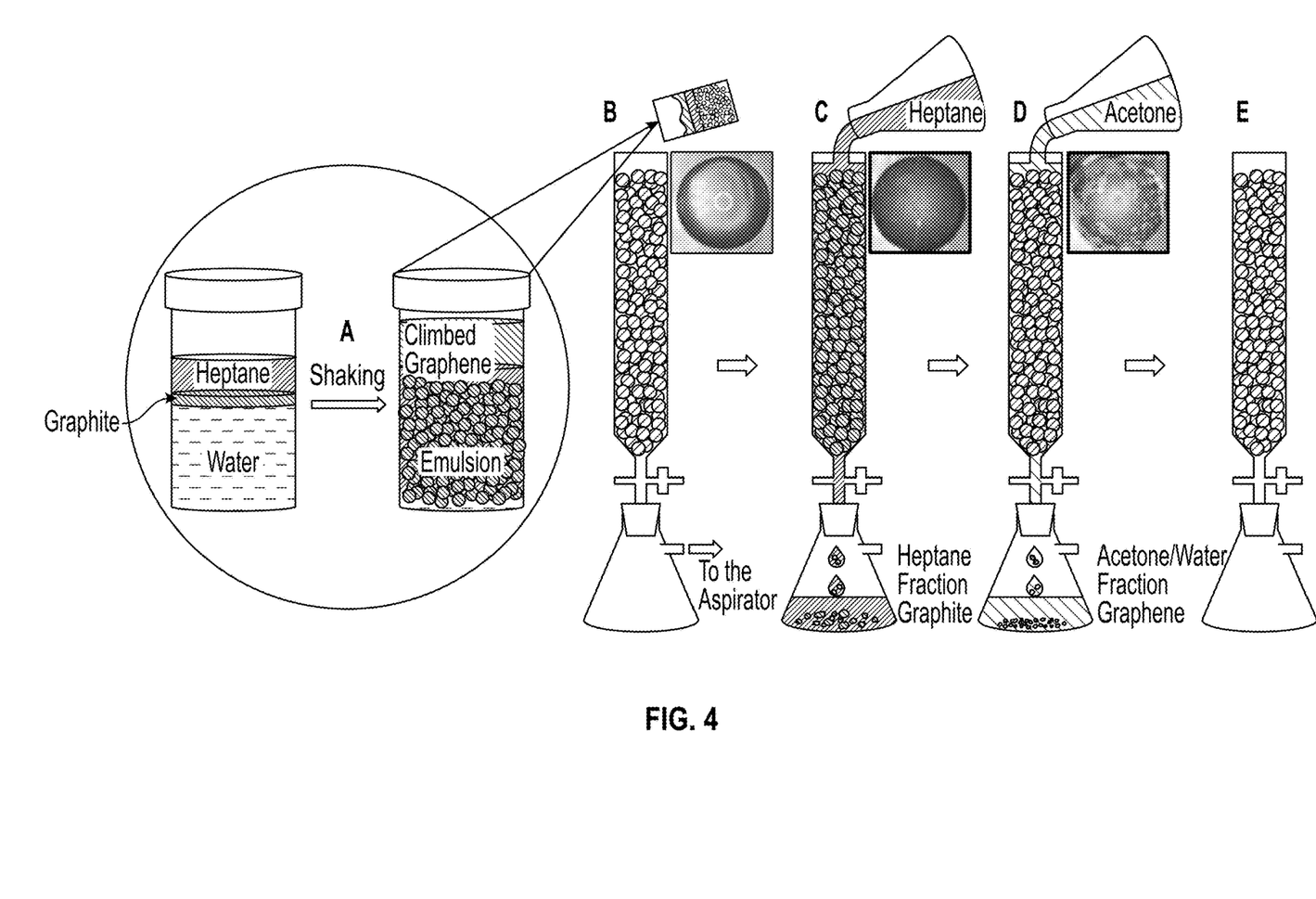
FIG. 4 is a schematic representation of an alternative exemplary multi-step glass bead-based procedure for graphene production according to the present disclosure.

In a further exemplary method for isolating graphene from graphite according to the present disclosure, a continuous approach was employed that started with a graphene-stabilized water-in-heptane emulsion. FIG. 4 provides a schematic illustration of the step-by-step process for the noted exemplary method.

In Step A of FIG. 4, a graphene-stabilized water-in-heptane emulsion is prepared by a surface-interface trapping method (SITM) and, in Step B, the emulsion is poured into a column filled with water-wet glass beads. Pre-wetting of the glass beads created a thin layer of water on the surface of the hydrophilic glass beads. After the emulsion passed through the column, the previously clear glass beads were black at the top of the column, gradually becoming clear toward the bottom. As shown in Step C of FIG. 4, subsequent aliquots of fresh heptane was effective in washing unabsorbed graphite out of the column and resulted in the glass beads becoming uniformly black. Heptane aliquots were added until no graphite was observed in the washes.

Figure 5A:
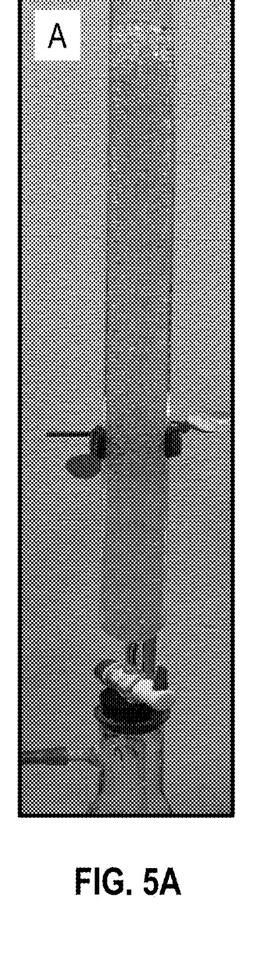
FIGS. 5A and 5B show images of glass beads before and after addition of exfoliated material.
Figure 5B:
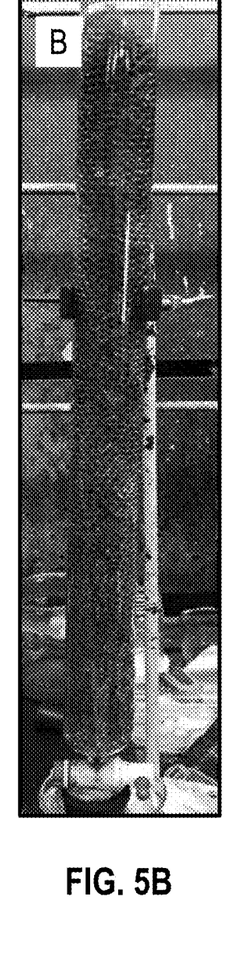

FIG. 5A shows a column filled with clean glass beads attached to a filter flask. FIG. 5B shows the glass beads after addition of interfacial trapping of exfoliated material prior to heptane wash. The efficiency of the heptane washes is shown in FIG. 5B.

Finally, to remove the material adsorbed to the beads, water or acetone is added to the glass beads in the column, as shown in Step D of FIG. 4. Acetone is generally used to remove the adsorbed graphene and few-layer graphene (FLG) due to its ease of removal compared to water. After washing, the column returns to its original state, as shown in Step E of FIG. 4.

The graphitic material from the initial emulsion was thus separated into two fractions: the material washed out by heptane, i.e., the heptane fraction graphite (HFG), and the fraction adsorbed to the glass beads that was later removed with acetone or water, i.e., the acetone/water fraction graphite (AWFG).

Figure 6A:
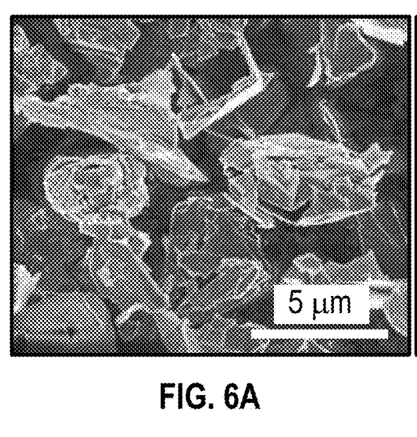
FIGS. 6A-6F provide a series of SEM/TEM images for materials collected from different fractions of a continuous process according to the present disclosure.
Figure 6B:
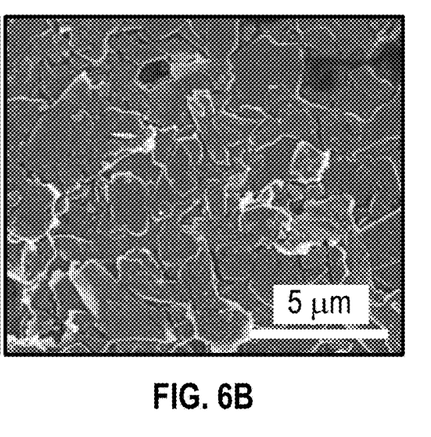
Figure 6C:
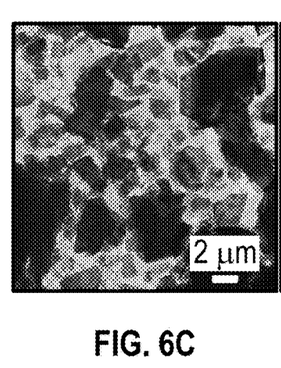
Figure 6D:
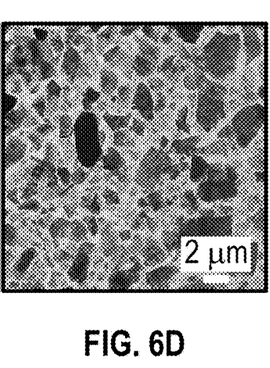
Figure 6E:
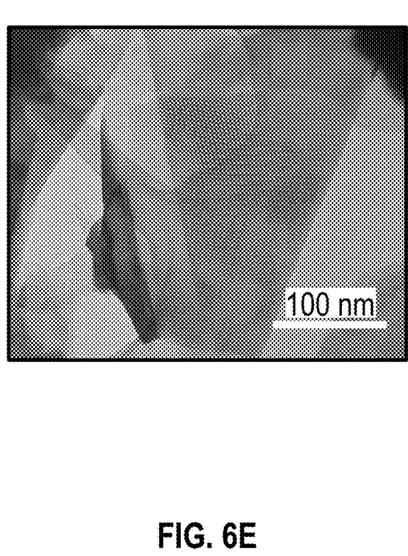
Figure 6F:
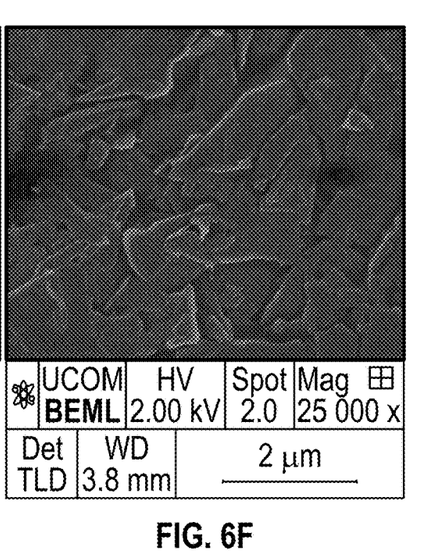

To evaluate the efficiency of this approach, electron microscopy was used, both scanning electron microscopy (SEM) and transmission electron microscopy (TEM), to locally compare the graphitic material in each of the two fractions, as well as Raman spectroscopy to characterize the samples globally. The images in FIGS. 6A-6F show the microscopy results from this continuous method of separation, i.e., a comparison of electron microscopy images from the material collected from the heptane and acetone fractions of the continuous process showing differences in the morphology of the graphitic material. Specifically, FIG. 6A provides an SEM image from the heptane wash, FIG. 6B provides an SEM image from the acetone wash, FIG. 6C provides a TEM image of the material from the heptane wash, FIG. 6D provides a TEM image from the acetone wash, FIG. 6E provides a higher-magnification image relative to FIG. 6D, showing the moiré patterns present in the overlapping graphene sheets from the acetone wash, and FIG. 6F showing an SEM image of AWFG at a higher magnification to show the thickness of the sheets.

The procedure for preparing the SEM and TEM samples generally entailed the following:

SEM Sample Preparation: Carbon glue on carbon tape on a SEM stub. The stub was pressed against dried graphite samples and excess graphite was blown off. The coating thickness was 18 nm (3 min. of coating).

TEM Sample Preparation: A 20 ml scintillation vial charged with 2 mg of graphitic material and 5 ml heptane. The vial was briefly sonicated and an additional 5 ml DI water was added to the vial followed by brief sonication. Sonication was used to disperse the material and was equally applied to both the heptane fraction and the acetone fraction. The graphite material was then climbed onto a glass slide, and the climbed film floated onto the surface of water. TEM grid ("holey" carbon film, Ted Pella, Inc.) was used to lift the graphene from the surface of the water. The graphene samples were characterized using TEM (FEI Lab6 20-120 kV transmission electron microscope) at 80 kV.

With specific reference to FIG. 6A, the SEM image of HFG shows that it contains graphite agglomerates and large flake graphite. Comparatively, the SEM image of AWFG shown in FIGS. 6B and 6F does not contain these agglomerates or large flakes, instead having overlapping sheets. This dramatic difference indicates that the graphitic material is very different in each phase. The separation of thin graphene sheets from thicker graphite flakes is a result of the smaller cross-sectional area of graphene. In a fluid flow, particles adhered to a surface can be displaced by interaction with the flowing fluid. However, small particles are less affected by the flowing fluid and tend to remain on the surface relative to larger particles. Thus, flowing heptane will tend to wash the larger particles through the system, leaving the thinner material adsorbed to the glass. Adding water or acetone changes the interfacial energy of the system, releasing the adsorbed graphene that had been stuck due to the mismatch of the surface energy of glass and heptane. TEM images of the HFG (FIG. 6C) and AWFG (FIG. 6D) show a sharp difference in the average electron transparency of the graphitic material and indicate a significant difference in the two fraction's degree of exfoliation. The dark regions of the TEM images show graphite, and the lighter areas indicate single graphene sheets or few-layer graphene flakes. We also observed moiré patterns (FIG. 6E) in the AWFG, which is known to be a result of the misaligned restacking of graphene monolayers.

Figure 7A:
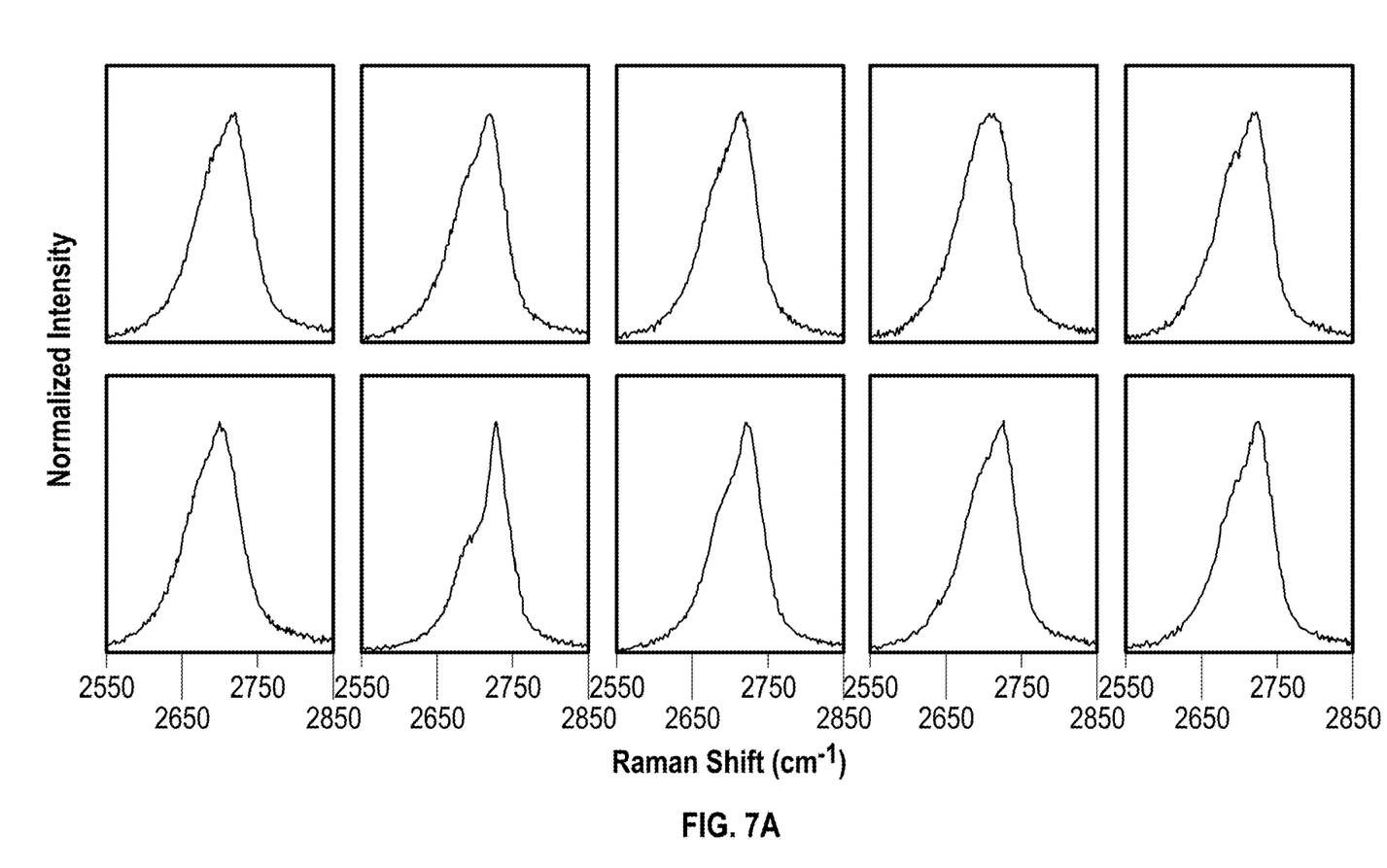
FIG. 7A provides Raman spectra of ten different spots on a heptane fraction graphite (HFG) sample (each spot covers an area of 20 μm)
Figure 7B:
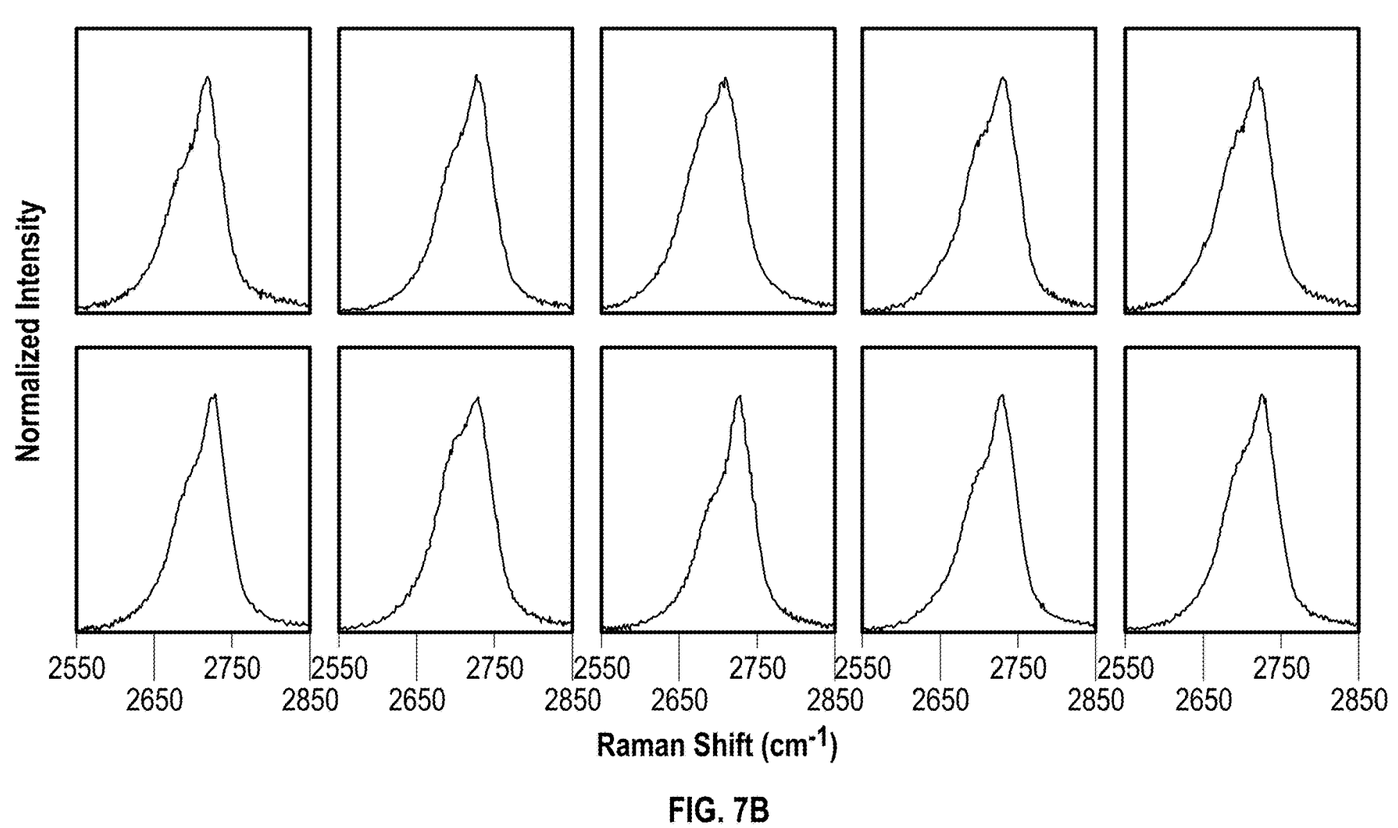
FIG. 7B provides Raman spectra of ten different spots on an acetone/water fraction graphite (AWFG) sample (each spot covers an area of 20 μm)

However, a more global technique, Raman spectroscopy, showed very little difference between the two fractions, as shown in FIGS. 7A and 7B. Even though microscopy suggested more graphite exfoliation in the AWFG relative to the HFG, the presence of some graphite flakes in both fractions seems to have made them difficult to distinguish by Raman spectroscopy.

An hypothesis for this result is that graphite flakes might have been stuck in the spaces between the glass beads or stuck behind larger flakes and thus impossible to wash through. To address this issue and confirm the hypothesis, the batch approach as schematically depicted in FIG. 1 that incorporated agitation of the glass beads to more thoroughly remove these occasional graphite flakes was employed.

Figure 8:
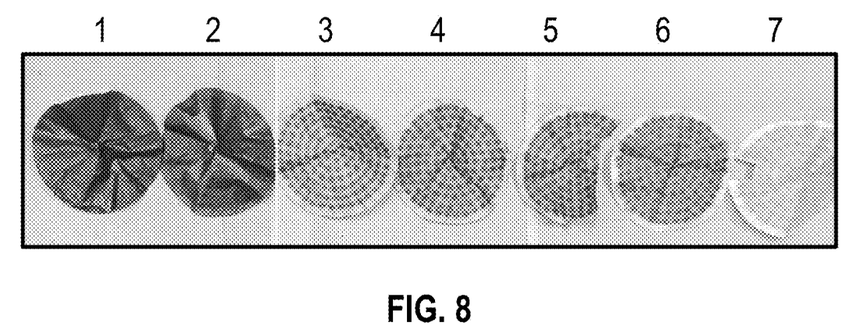
FIG. 8 is an image showing a progression of washing of graphitic material as captured on filter paper.

The difference in the two approaches is the method of removing unexfoliated graphite. The batch approach added the graphene-stabilized emulsion to a flask containing wetted glass beads rather than to a column packed with beads (FIG. 1, Step A). The flask was then shaken, and graphene was observed spread on the surface of the glass beads. Heptane was then added, the flask was shaken gently to avoid cracking the glass beads (FIG. 1, Step B), and then, the heptane was decanted from the beads. This heptane fraction was then filtered for reuse and to collect samples for analysis. This process of washing, agitating, and filtering was continued (FIG. 1, Step C) until the amount of the graphitic material on the filter paper was difficult to detect by Raman spectroscopy (see FIG. 8 for progression of washing process). At the point that graphitic material was difficult to detect, the beads were washed with acetone (FIG. 1, Step D), and graphene and FLG that had been adhered to the glass beads were collected by filtration (FIG. 1, Step E). The addition of agitation in the batch procedure was significantly more effective at removing the less exfoliated material compared to the continuous procedure as evidenced by electron microscopy and Raman spectroscopy.

Figure 9A:
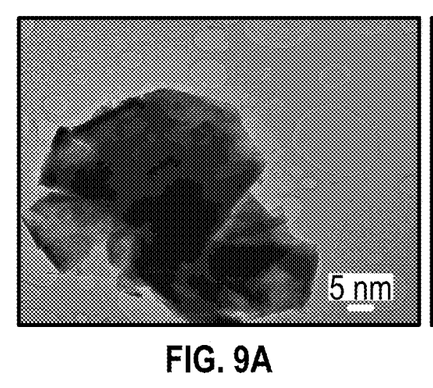
FIGS. 9A-9D provide a series of SEM/TEM images for materials collected from different fractions according to the present disclosure.
Figure 9B:
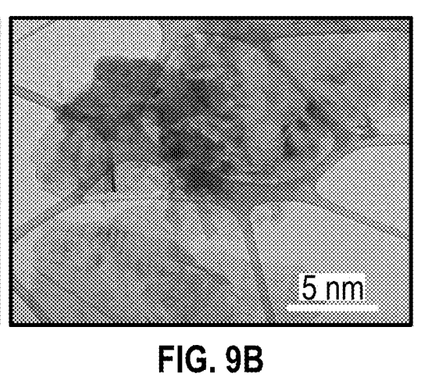
Figure 9C:
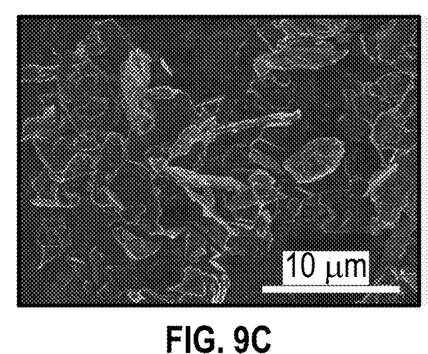
Figure 9D:
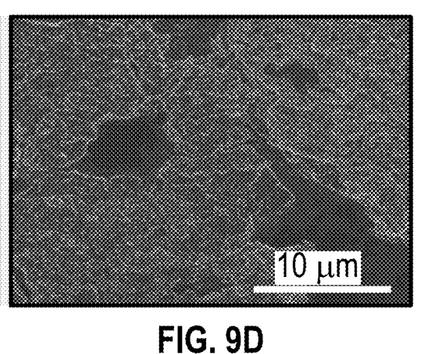

FIGS. 9A-9D provide electron microscopy images from the batch process described above that compare the graphitic material obtained from different fractions of such batch process. FIG. 9A provides a TEM image of HFG, and FIG. 9B provides a TEM image of the AWFG fraction. FIG. 9C provides an SEM image of the material obtained from the HFG fraction, and FIG. 9D provides an SEM image of the AWFG fraction, showing large areas of overlapping graphene and FLG.

Thus, similar to FIGS. 6A-6F, FIGS. 9A-9D shows a comparison by TEM of the graphitic material obtained from the HFG (FIG. 9A) and the material obtained from the AWFG (FIG. 9B). Thin, exfoliated sheets are clearly seen in the AWFG, with moiré patterns evident in several locations. SEM images indicated that large graphite flakes and agglomerates were washed out with heptane (FIG. 9C) leaving behind overlapping graphene sheets (FIG. 9D), which came off the glass beads with acetone or water. Although like in FIGS. 6A-6F, these microscopy images do not prove global exfoliation, in the batch process enough graphite is removed that Raman spectroscopy indicated a significant degree of exfoliation in the AWFG.

Figure 10:
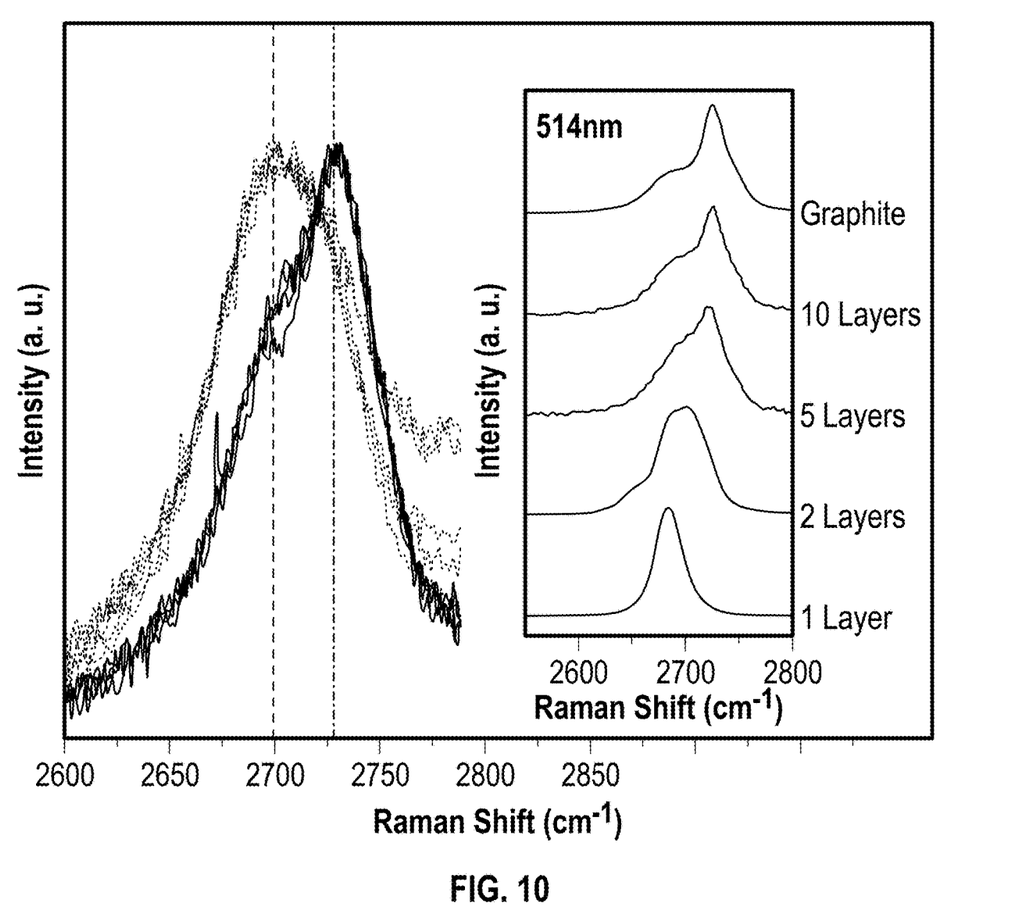
FIG. 10 provides the 2D peak of Raman spectra from five different spots of AWFG (left-most plot) shows that it contains one- to two-layer graphene compared to the HFG (right-most plot) in the batch procedure. The inset shows the evolution of the 2D peak as a function of the number of layers of graphite.

The 2D peaks of the Raman spectra of the two graphite fractions from the batch procedure are shown in FIG. 10. The spectra were collected at five different spots of each fraction and overlaid. The 2D band of graphite appears around 2700 cm$^{-1}$ and can be used as an indication of the extent of exfoliation. As shown in the inset, the 2D peak changes its shape and position as graphite exfoliates into one- or few-layer graphene. For the HFG fraction, the 2D peak was located at ~2730 cm$^{-1}$ with a shoulder peak. For the AWFG fraction, the 2D peak was at ~2700 cm$^{-1}$ without the shoulder peak observed for the HFG. This shift of 30 cm$^{-1}$ for the 2D peak and lack of a shoulder in the AWFG are an indication that the AWFG contains graphene and FLG that is not apparent in the HFG. All five Raman spectra taken at different locations on the AWFG sample are consistent. The spot size used to acquire each spectrum was 50 µm in diameter, providing evidence for the effectiveness of this approach in separating exfoliated sheets from graphite flakes.

Figure 11A:
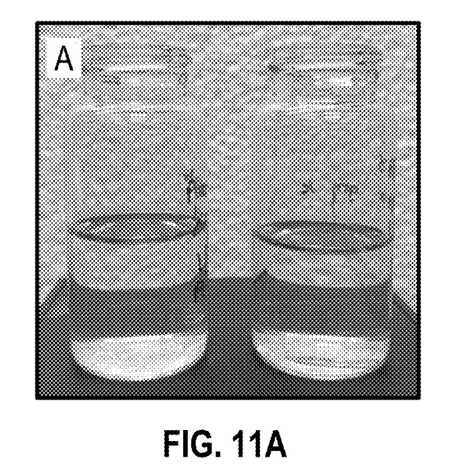
FIG. 11A provides two image showing pure acetone (left) and acetone wash containing AWFG (right), showing both to be transparent to the naked eye.
Figure 11B:
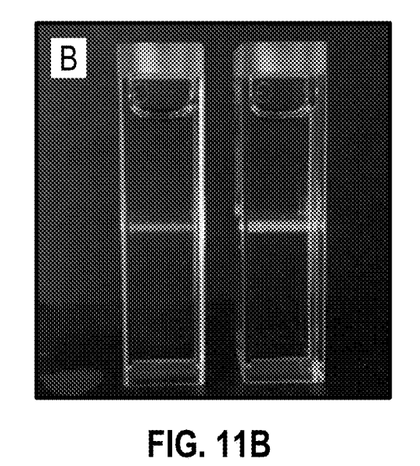
FIG. 11B provides two images in which a laser beam is passed through pure acetone (left) and acetone with AWFG (right).
Figure 12A:
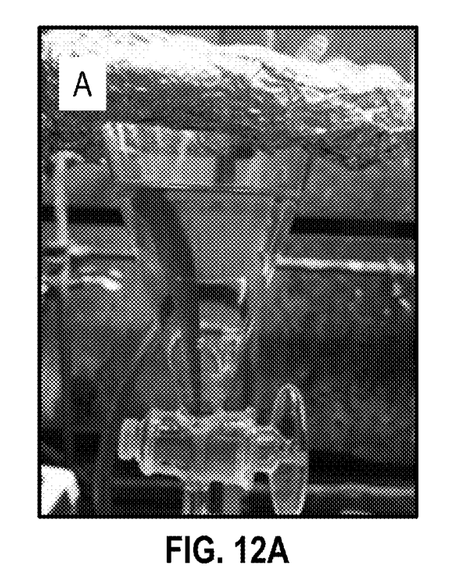
FIG. 12A provides a further image showing that the acetone wash is transparent and clear to the naked eye.
Figure 12B:
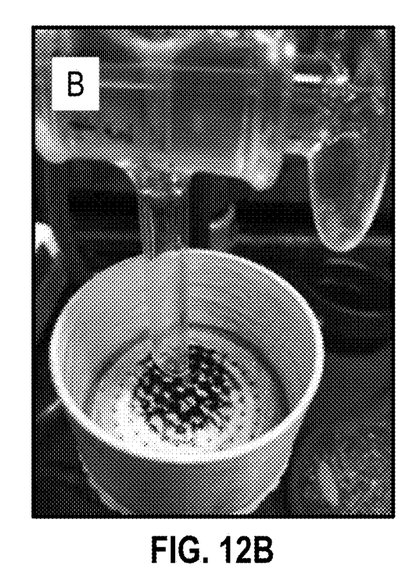
FIG. 12B is an image showing black graphene collected when filtering the acetone wash in the disclosed batch procedure.

Evidence for exfoliation was also provided by examination of the final acetone washes used to remove graphene from the glass beads. As shown in FIGS. 11A and 12A, the acetone wash was clear to the naked eye. The presence of graphene in the wash was proven by collecting black material by filtering (FIG. 12B) and by passing a laser beam through the acetone wash and observing the Tyndall effect (FIG. 11B) arising from the suspended graphene sheets. Brownian motion is sufficient to keep the graphene sheets suspended without aggregation, even in a volatile nonsolvent such as acetone.

In order to determine the yield of graphene obtained by the disclosed chromatographic methods, the theoretical mass percentage of graphene that could be obtained by a given surface area of glass beads was calculated. For the batch procedure, 5 mm glass beads with an average mass of 156 mg and a surface area of 78.54 mm$^2$ per bead were used. By measuring the total mass of the glass beads used, the number of glass beads is calculated to be 2174. So, the total area available for graphene to climb is ~17 m$^2$. The specific surface area of one side of a graphene sheet is 1315 m$^2$/g. Therefore, assuming graphene is fully spread across the total area of the glass beads, the mass of graphene that can be collected from 2174 beads would be 13 mg. The experimental mass of collected graphene ranged from 4 to 9 mg or 30 to 70% relative to the available glass surface area. This is less than 100% due to losses in filtration and open areas on the glass beads caused by bead-to-bead contact and sheet dislodgement during washing.

The yield of graphene relative to the starting graphite was around 5% from the batch approach. It is believed that this number could be improved by decreasing the mass of starting graphite or increasing the number of glass beads. However, a 100% yield is likely impossible to achieve from natural flake graphite because the graphene yield will depend on the crystallinity of the starting graphite material. Natural graphite contains irregular stacking and grain boundaries, which makes it difficult to exfoliate. Obtaining 5 g of graphene by this method would require 100 g of graphite, and the cost of 100 g of graphite used in our study is approximately $5. For comparison, the cost of 5 g of commercially available graphene (number of layers, <10; graphene average particle diameter, 6 µm) is $620.39. While our cost does not include processing, our use of water or acetone and recyclable heptane suggests that the processing costs would be reasonable. In an automated process, the yield would be even higher and cost potentially lower.

Of the two approaches presented, the batch approach gave superior results at the laboratory scale. However, the continuous procedure may be more suitable for industrial purposes as it would avoid possible cracking of glass beads by agitation and could be modified to an industrial scale by using high-pressure systems to pass the solvents through the column quickly. This would lead to more effective removal of unexfoliated graphite than was possible with our laboratory setup.

Thus, the systems and methods of the present disclosure use a glass substrate to selectively withdraw exfoliated graphene from a high-energy interface between immiscible solvents. The exfoliated graphene preferentially adheres to the surface of the glass substrate for withdrawal from the noted high energy interface, leaving behind the graphite (which is too large to be effectively adsorbed relative to the glass substrate). The noted systems and methods are easily implemented and offer significant advantages for graphene production relative to conventional systems and methods, e.g., the disclosed systems/methods do not require the input of heat or mechanical energy which translates to processes that are both cheaper to run and do not result in damage to the graphene. Still further, the disclosed systems/methods do not require chemical modification of the graphene, again lowering the cost considerably and not damaging the graphene structure.

Two chromatographic approaches, continuous and batch, are demonstrated herein to extract high-quality graphene from natural flake graphite. The solvents used, water or acetone and heptane, are inexpensive and can be recycled for multiple graphite exfoliations. The solvent interfacial trapping method utilized does not require high-energy input like tip sonication or harsh chemicals, surfactants, or high-boiling-point solvents as used in current liquid exfoliation methods. The extracted graphene is pristine as opposed to reduced graphene oxide that is known to contain defects and residual chemical functional groups. The disclosed methods open a new pathway to extract high-quality graphene from graphite, enabling many cost-sensitive applications.

EXAMPLES

Materials. Natural graphite with a flake size of 3-5 µm (Micro 850) was obtained from Asbury Graphite Mills, Inc.

Technical-grade n-heptane and acetone were purchased from Fisher Scientific. Glass beads with diameters of 4 and 5 mm were obtained from Pyrex.

Emulsion Preparation. To prepare the standard emulsion, 60 mL of n-heptane was added to 1000 mg of graphite in a 200 mL glass vial. Brief low-power bath sonication (Branson 80 W B2510DTH) was occasionally used for not more than 20 min to break up large graphite aggregates. Next, 140 mL of DI water was added, and the vial was hand-shaken for several minutes to exfoliate graphite and make the emulsion.

Figure 13:
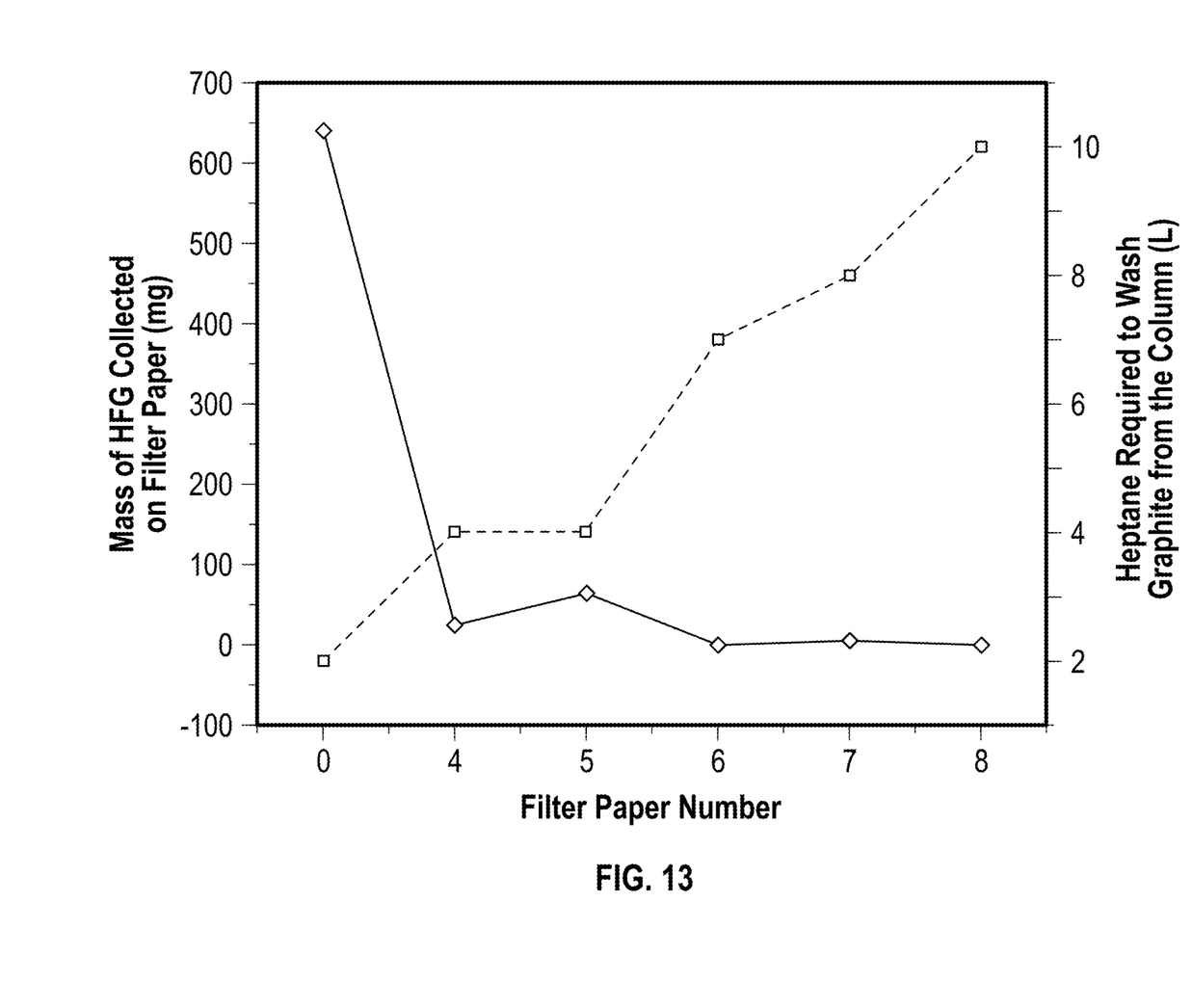
FIG. 13 is a plot showing that the mass of graphitic material collect on filter paper becomes insignificant as the number of heptane washings increase.

Continuous Procedure. First, a 500 mL glass chromatography column was attached to a filtration funnel and connected to an aspirator. Then, the column was filled with dried glass beads. The glass beads were cleaned in a base bath, washed with DI water, and dried prior to adding to the chromatography column. After the column was filled with glass beads, 100 mL of water was passed through to wet the beads. The aspirator was kept running for about 10 min to remove excess water from the column. This prepared emulsion was then poured onto the glass beads inside the column. Next, heptane was used to wash the unexfoliated graphite from the column until no more graphite came out (see FIG. 13) by using 1 L heptane washes. Each 1 L of heptane wash was filtered with a filter paper (Ahlstrom, 6 µm pore size) to collect the heptane fraction graphite. The remaining graphene attached to the glass beads was removed by using either water or acetone until all graphene came off the beads and the beads were clear. Graphene was collected by filtering water or acetone onto a filter paper (Ahlstrom, 6 µm pore size). All the filter papers with each graphite fraction were placed in a convection oven (Blue M, Stabil-Therm) at 60° C. overnight to dry.

Batch Procedure. A scaled-down version of the standard emulsion was used, with 6 mL of n-heptane and 100 mg of natural graphite added to a 40 mL glass vial followed by 14 mL of DI water. Cleaned and dried glass beads (as mentioned in the continuous procedure) were added into a conical flask. Then, 100 mL of water was added to wet the glass beads. The mouth of the flask was covered with a wire screen (1 mm×1 mm mesh size) to hold the glass beads in place during decanting. Then, the prepared emulsion was poured on to the glass beads inside the flask. Next, heptane was used as a wash to remove unexfoliated graphite. This was done by repeated washing with ~300 mL of heptane with the flask being shaken about 3-5 s then pouring heptane and suspended graphite onto a filter paper (Whatman, grade 50, 2.7 µm pore size) to collect the heptane fraction graphite. This process was continued until no more graphite came out from the column. The remaining graphene attached to the glass beads was removed by using six 300 mL washes of acetone or water, shaking the flask for about 3-5 s for each wash, and filtering acetone through a PTFE membrane (0.45 µm pore size) to collect the acetone/water fraction graphene. All the filter papers and PTFE membranes with each graphite fraction were placed in a convection oven (Blue M, Stabil-Therm) at 60° C. overnight to dry.

Characterization Methods. The difference in morphology of heptane fraction graphite and acetone/water fraction graphene was analyzed using a scanning electron microscope (FEI Nova NanoSEM 450) and a transmission electron microscope (FEI Tecnai 12 G2 Spirit BioTWIN). Raman spectra were obtained using a spectrometer (Renishaw system 2000) at 514 nm laser excitation.

Although the systems and methods of the present disclosure have been described with reference to exemplary implementations thereof, the disclosed systems and methods are not limited by or to such exemplary implementations. Rather, various modifications, refinements and/or enhancements may be made with respect to the disclosed systems and methods without departing from the spirit or scope of the present invention, as will be readily apparent to persons of skill in the art.

BACKGROUND PUBLICATIONS

Li, X.; Cai, W.; An, J.; Kim, S.; Nah, J.; Yang, D.; Piner, R.; Velamakanni, A.; Jung, I.; Tutuc, E.; Banerjee, S. K.; Colombo, L.; Ruoff, R. S. Large-Area Synthesis of High-Quality and Uniform Graphene Films on Copper Foils. Science. 2009, 324 (5932), 1312-1314. https://doi.org/10.1126/science.1171245.

Hernandez, Y.; Nicolosi, V.; Lotya, M.; Blighe, F. M.; Sun, Z.; De, S.; McGovern, I. T.; Holland, B.; Byrne, M.; Gun'ko, Y. K.; Boland, J. J.; Niraj, P.; Duesberg, G.; Krishnamurthy, S.; Goodhue, R.; Hutchison, J.; Scardaci, V.; Ferrari, A. C.; Coleman, J. N. High-Yield Production of Graphene by Liquid-Phase Exfoliation of Graphite. Nat. Nanotechnol. 2008, 3 (9), 563-568. https://doi.org/10.1038/nnano.2008.215.

Lotya, M.; Hernandez, Y.; King, P. J.; Smith, R. J.; Nicolosi, V.; Karlsson, L. S.; Blighe, F. M.; De, S.; Zhiming, W.; McGovern, I. T.; Duesberg, G. S.; Coleman, J. N. Liquid Phase Production of Graphene by Exfoliation of Graphite in Surfactant/Water Solutions. J. Am. Chem. Soc. 2009, 131 (10), 3611-3620. https://doi.org/10.1021/ja807449u.

Paton, K. R.; Varrla, E.; Backes, C.; Smith, R. J.; Khan, U.; O'Neill, A.; Boland, C.; Lotya, M.; Istrate, O. M.; King, P.; Higgins, T.; Barwich, S.; May, P.; Puczkarski, P.; Ahmed, I.; Moebius, M.; Pettersson, H.; Long, E.; Coelho, J.; O'Brien, S. E.; McGuire, E. K.; Sanchez, B. M.; Duesberg, G. S.; McEvoy, N.; Pennycook, T. J.; Downing, C.; Crossley, A.; Nicolosi, V.; Coleman, J. N. Scalable Production of Large Quantities of Defect-Free Few-Layer Graphene by Shear Exfoliation in Liquids. Nat. Mater. 2014, 13 (6), 624-630. https://doi.org/10.1038/nmat3944.

Coleman, J. N. Liquid-Phase Exfoliation of Nanotubes and Graphene. Adv. Funct. Mater. 2009, 19 (23), 3680-3695. https://doi.org/10.1002/adfm.200901640.

Coleman, J. N.; Lotya, M.; O'Neill, A.; Bergin, S. D.; King, P. J.; Khan, U.; Young, K.; Gaucher, A.; De, S.; Smith, R. J.; Shvets, I. V.; Arora, S. K.; Stanton, G.; Kim, H. Y.; Lee, K.; Kim, G. T.; Duesberg, G. S.; Hallam, T.; Boland, J. J.; Wang, J. J.; Donegan, J. F.; Grunlan, J. C.; Moriarty, G.; Shmeliov, A.; Nicholls, R. J.; Perkins, J. M.; Grieveson, E. M.; Theuwissen, K.; McComb, D. W.; Nellist, P. D.; Nicolosi, V. Two-Dimensional Nanosheets Produced by Liquid Exfoliation of Layered Materials. Science (80-.). 2011, 331 (6017), 568-571. https://doi.org/10.1126/science.1194975.

Seiler, S.; Halbig, C. E.; Grote, F.; Rietsch, P.; Börrnert, F.; Kaiser, U.; Meyer, B.; Eigler, S. Effect of Friction on Oxidative Graphite Intercalation and High-Quality Graphene Formation. Nat. Commun. 2018, 9 (1), 1-9. https://doi.org/10.1038/s41467-018-03211-1.

The invention claimed is:

1. A method for graphene production, comprising:
  a. providing a continuous graphene recovery system that includes a glass fiber that defines a continuous loop, a first vessel containing graphite and immiscible solvents for exfoliating graphene at a high-energy interface between the immiscible solvents, and a second vessel containing a fluid for separating adsorbed graphene from the glass fiber;

b. moving a segment of the glass fiber loop through the high-energy interface within the first vessel to permit adsorption of exfoliated graphene from the high-energy interface onto the segment of the glass fiber loop;

c. moving the segment of the glass fiber loop through the second vessel to permit separation of the adsorbed exfoliated graphene from the segment of the glass fiber loop and deposit of graphene in the fluid; and d. repeating steps (a)-(c) to recover additional graphene in the fluid.

2. The method of claim 1, wherein the immiscible solvents define an emulsion.

3. The method of claim 1, wherein the segment of the glass fiber loop is wetted prior to contact with the high-energy interface.

4. The method of claim 3, wherein the segment of the glass fiber loop is wetted with water.

5. The method of claim 1, wherein the high-energy interface is established by first and second surface/solvent constituents selected from the group consisting of:

a. first surface/solvent constituent: water; second surface/solvent constituent: heptane, pentane, or other alkane;

b. first surface/solvent constituent: glass (hydrophilic); second surface/solvent constituent: heptane, pentane or other alkane;

c. first surface/solvent constituent: chlorosilane treated glass (hydrophobic): second surface/solvent constituent: water;

d. first surface/solvent constituent: water; second surface/solvent constituent: styrene, methyl methacrylate or a comparable monomer;

e. first surface/solvent constituent: water; second surface/solvent constituent: chloroform;

f. first surface/solvent constituent: gallium; second surface/solvent constituent: heptane;

g. first surface/solvent constituent: glycerol; second surface/solvent constituent: heptane;

h. first surface/solvent constituent: heptane; second surface/solvent constituent: acetonitrile;

i. first surface/solvent constituent: PTFE; second surface/solvent constituent: water;

j. first surface/solvent constituent: gallium; second surface/solvent constituent: water;

k. first surface/solvent constituent: HDPE; second surface/solvent constituent: water;

l. first surface/solvent constituent: polypropylene; second surface/solvent constituent: water.

* * * * *